United States Patent [19]

Hull et al.

[11] 4,016,421

[45] Apr. 5, 1977

[54] ANALYTICAL APPARATUS WITH VARIABLE ENERGY ION BEAM SOURCE

[75] Inventors: Charles W. Hull, Sierra Madre; T. Wilson Whitehead, Monrovia; Bruce N. Colby, Glendora, all of Calif.

[73] Assignee: E. I. Du Pont de Nemours and Company, Wilmington, Del.

[22] Filed: Feb. 13, 1975

[21] Appl. No.: 549,505

[52] U.S. Cl. .......... 250/281; 250/423 R

[51] Int. Cl.[2] .......... B01D 59/44; H01J 27/00

[58] Field of Search .......... 250/427, 425, 424, 423, 250/281, 288

[56] References Cited

UNITED STATES PATENTS

| | | | |
|---|---|---|---|
| 3,155,826 | 11/1964 | Peters | 250/427 |
| 3,461,285 | 8/1969 | Werner | 250/427 |
| 3,633,027 | 1/1972 | Ryhage | 250/288 |
| 3,849,656 | 11/1974 | Wallington | 250/427 |

*Primary Examiner*—Alfred E. Smith
*Assistant Examiner*—David K. Moore

[57] ABSTRACT

Disclosed herein is an analytical apparatus comprising a gas chromatograph, a mass spectrometer, and an interface connecting the two. The mass spectrometer comprises a variable energy ion beam source, a magnetic sector of substantially fixed magnetic field for deflecting the ions in the ion beam according to their momentum, and a detector for detecting those ions within the ion beams which have been deflected by a given angle by the magnetic sector. The variable energy ion source comprises a repeller electrode, a first low energy alignment electrode coacting with the repeller electrode to define an ion-forming region, an inlet means for introducing gas into the ion-forming region, means for forming an electron beam in the ion-forming region, a second high energy alignment electrode, and an entrance electrode separating the ion beam source from the magnetic sector. The repeller electrode is maintained at a constant potential relative to the first alignment electrode, the second alignment electrode is maintained at a potential more negative than but proportional to that of the first alignment electrode, and the first alignment electrode is maintained at a potential positive with respect to entrance electrode. By varying the potential of the first alignment electrode relative to the entrance electrode, the mass spectrum can be swept.

26 Claims, 11 Drawing Figures

ANALYTICAL APPARATUS WITH VARIABLE ENERGY ION BEAM SOURCE

BACKGROUND OF THE INVENTION

1. Field of the Invention:

The present invention relates to a variable energy ion beam source for use with a mass spectrometer. More specifically, it relates to an analytical apparatus utilizing a gas chromatograph and a mass spectrometer in which the mass spectrum is swept by varying the energy of the ion beam source.

2. Discussion of the Prior Art:

Both gas chromatographs and mass spectrometers have been used as analytical tools. It has long been recognized that a powerful analytical tool could be obtained by the coupling of these two instruments. However, gas chromatographs generally operate at atmospheric pressure while mass spectrometers operate at a greatly reduced pressure. To account for this, some interfacing means must be provided to reduce the pressure of the sample gas leaving the gas chromatograph before it is introduced into the mass spectrometer. Furthermore, since gas chromatographs operate by sweeping a small amount of sample gas through a column, using a high volume of a carrier gas, some means must be found to enrich the concentration of the sample gas relative to the carrier gas before the gas mixture reaches a mass spectrometer. Failure to do this will reduce the sensitivity of the mass spectrometer.

A gas chromatograph separates the various components of a sample gas so that the composition of the gas leaving the chromatograph varies with time. Because of the continually changing composition of the gas stream reaching the mass spectrometer, any mass spectrometer which is designed for use in conjunction with a gas chromatograph must be one capable of sweeping rapidly across the mass spectrum, so that the changing composition of the output of the gas chromatograph is reflected. For mass spectrometers of the magnetic sector design, mass sweeping can be accomplished by either varying the magnetic field or by varying the energy of the ion beam. Varying the magnetic field, however, is a comparatively slow process, so there is an advantage to sweeping the energy of the ion beam.

In the past, magnetic mass spectrometers were massive structures in which the entire ion beam, including the ion beam source, were contained in the magnetic field. The amount of metal acquired to produce such a magnetic field is uneconomical, so in recent years, the size of the magnet has been reduced to the point where only a small segment of the ion beam path actually passes between the poles of the magnet. At least for those situations in which the ion beam source is located outside of the analyzing magnetic poles, no satisfactory solution to the production of an ion beam by varying the potential of the ion beam source has been found. Such sources can be produced when the energy of the beam is swept over a small range of energies, but in the situation where it is necessary to sweep the energy of the beam over a wide range of energies to encompass a large portion of the mass spectrum, ion beam focus over the entire range has not been achieved. Focus can be achieved at one energy, but as the energy changes, the focus of the ion beam changes, and eventually the ion beam is extinguished.

There are a number of additional problems that arise in an analytical system combining a gas chromatograph with a mass spectrometer utilizing a variable energy ion source. For one thing, since some means must be utilized to decrease the pressure in the interface between the gas chromatograph and the mass spectrometer, from about atmospheric pressure in the chromatograph to about 0.001 Torr in the ion source, the pressure in the interface must pass through a region which is ideally suited for gas discharge. When combined with the high energy of the ion beam source, this region of reduced pressure produces a gas discharge in the connecting line. For obvious reasons, this is unacceptable.

SUMMARY OF THE INVENTION

These and other disadvantages are overcome in a source to produce a variable energy ion beam comprising:

a. a repeller electrode;

b. first, low energy, alignment electrode, having first alignment slit therein and coacting with the repeller electrode to define an ion-forming region therebetween;

c. inlet means for introducing gas into the ion-forming region;

d. means for forming an electron beam in the ion-forming region;

e. second, high energy, alignment electrode having second alignment slit therein;

f. an entrance electrode having an entrance slit therein, all of the aforesaid electrodes being in sequential order and all of the aforesaid slits being aligned to define a trajectory between the electron beam and the entrance slit;

g. means for maintaining the repeller electrode at a constant potential relative to said first alignment electrode;

h. means for maintaining the second alignment electrode at a potential more negative than and proportional to that of the first alignment electrode; and i. means to maintain the first alignment electrode at a positive potential relative to the entrance electrode and to vary its potential relative to the entrance electrode.

In a preferred embodiment, a fifth electrode, called the extraction electrode, with an extraction slit therein, is incorporated into the ion source between the first and second alignment electrodes. In this embodiment it is the potential of the extraction electrode which is varied relative to the potential of the entrance electrode. The first alignment electrode is maintained at a constant positive potential relative to the extraction electrode, and the second alignment electrode is maintained at a potential more negative than but proportional to that of the extraction electrode.

In a still more preferred embodiment, the ion beam source comprises a housing having a cavity in which the repeller electrode and the first alignment electrode are located. Some means to maintain the housing at a constant positive potential relative to the first alignment electrode is also provided.

When the above described variable energy ion beam source is used in a mass spectrometer which is combined with a gas chromatograph, an interface for connecting the gas outlet of the gas chromatograph to the inlet of the ion beam source must be provided. In a preferred embodiment, this gas interface comprises a plurality of electrical conductors disposed relative to the low pressure regions of the interface conduit and some means is provided to maintain the potential of these electrical conductors at or about the potential of the ion beam source.

BRIEF DESCRIPTION OF THE FIGURES

The present invention can best be described with reference to the following figures in which.

DETAILED DESCRIPTION OF THE EMBODIMENT

Figure 1:
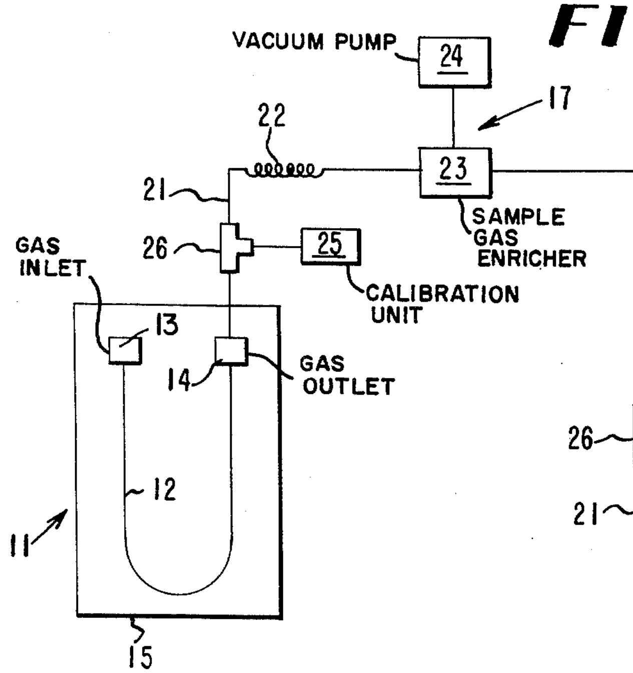
FIG. 1 is a schematic diagram of an analytical apparatus comprising a gas chromatograph, a mass spectrometer, and an interface connecting the gas chromatograph to the mass spectrometer.

Referring to the figures, FIG. 1 shows a gas chromatograph 11, comprising a chromatographic column 12, a gas inlet 13, and a gas outlet 14. The column, inlet, and outlet are of conventional design, well known to those skilled in the art. In particular, the column may be a glass column filled with a conventional chromatographic packing material, and the inlet may be a conventional injection system. Normally, the column, the inlet, and the outlet are contained in an oven indicated generally as 15, also of conventional design, so that the temperature of the gas chromatograph may be controlled and varied if desired.

Gas chromatograph 11 is connected to a mass spectrometer, indicated generally as 16, by an interface, indicated generally as 17. The mass spectrometer 16 comprises a variable energy ion beam source 18, a magnetic sector 19, and a detector means 20. The gas interface 17 comprises an electrically nonconductive interface conduit 21 containing a restriction 22 and a sample gas enricher 23. The interface conduit 21 is normally a glass tube connected at one end to the gas outlet 14 of chromatograph 11, and at the other end to the ion beam source 18 of the mass spectrometer 16. Restriction 22 is generally a coil of capillary tubing, designed to create a pressure drop in the interface conduit between the gas chromatograph and the mass spectrometer.

Gas chromatographs generally operate at about one atmosphere, whereas the pressure in the ion source of a mass spectrometer is characteristically about 0.001 Torr. The dimensions of the restriction are chosen, in conjunction with the dimensions of the sample gas enricher 23 to produce the desired pressure in the ion beam source. Such a choice is well within the capability of one skilled in the art of gas handling.

Gas chromatographic separation involves the process of using a carrier gas to force a sample gas through a column containing a separation medium. The carrier gas is generally an inert gas, such as helium. Once the sample gas has been "carried" through the chromatographic column by the carrier gas, the function of the carrier gas has been served and its presence in high concentrations impedes identification of the various sample gas components by the mass spectrometer. The function of the sample gas enricher 23 is to enrich the concentration of sample relative to carrier in the gas entering the ion beam source. A number of such gas enrichers are known to those skilled in the art. One specific device known as a jet separator, will be described below. Generally, such devices are designed to pass as much of the sample gas as possible through the remaining interface conduits to the ion beam source, while the majority of the carrier gas is pumped away via vacuum pump 24.

Figure 2:
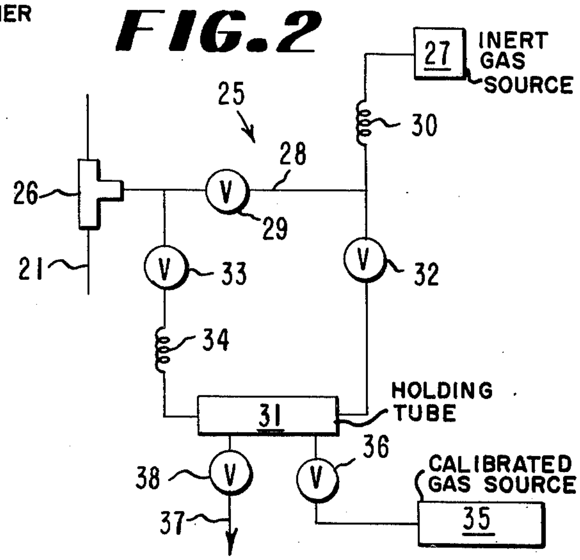
FIG. 2 is a schematic diagram of a disconnect and calibration unit which may be used in conjunction with the analytical apparatus shown in FIG. 1.

Mass spectrometers are susceptible to contamination by air. Therefore, some system to permit removal of the chromatographic column without contaminating the mass spectrometer must be provided. Furthermore, the mass spectrometer should be calibrated from time to time. Both of these functions are accomplished by a disconnect and calibration unit 25 connected to interface conduit 21 by tee 26, and shown in more detail in FIG. 2.

Disconnect and calibration unit 25 comprises a pressurized source 27 of inert gas, such as helium, connected to interface conduit 21 by an inert gas conduit 28 and tee 26. Also provided are a shut off valve 29 and a pressure control restriction 30. Prior to disconnecting the chromatographic column at gas outlet 14, valve 29 is opened so that the inert gas from source 27 floods interface conduit 21 and prevents air from contaminating the mass spectrometer. In addition, disconnect and calibration system 25 comprises a holding tube 31 connected to inert gas conduit 28 in parallel with valve 29 and isolated from it by two valves 32 and 33. A pressure control restriction 34 may also be included in the parallel line to control the flow of gas through that line. A source 35 of calibration gas is connected to holding tube 31 by valve 36, and an exhaust vent 37 with associated valve 38, are also provided. The valves are normally remote control valves of conventional design, the conduits and connecting lines are generally glass or stainless steel tubes, and the restrictions are generally capillary coils.

Any gas of known mass spectra can be used to calibrate the mass spectrometer. A fluorocarbon gas known as FC–43 is one such gas. With valves 32 and 33 closed, holding tube 31 is filled with calibration gas by opening valve 36 and closing valve 37. Valve 36 is then closed, to isolate the calibration gas in holding tube 31, valve 29 is closed, and valves 32 and 33 are opened. Inert gas from source 27 acts as a carrier to force the calibration gas into the mass spectrometer in much the same way that the chromatographic carrier gas forces sample gas into the mass spectrometer. The dimensions of the holding tube and connecting lines are chosen so that the proper concentration of calibration gas reaches the mass spectrometer. Such choice is well within the capability of one skilled in art of gas handling.

Figure 4:
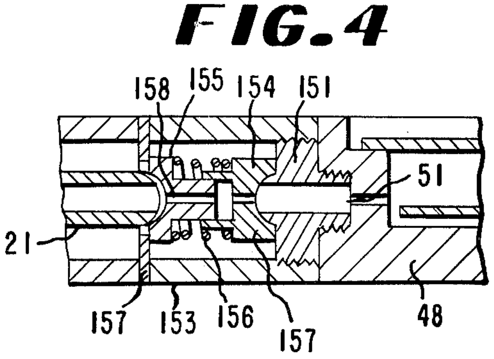
FIG. 4 is a cross-sectional view of a preferred interconnection between the interface and the ion beam source to provide a path for sample gas into the ion-forming region of the ion beam source.
Figure 3:
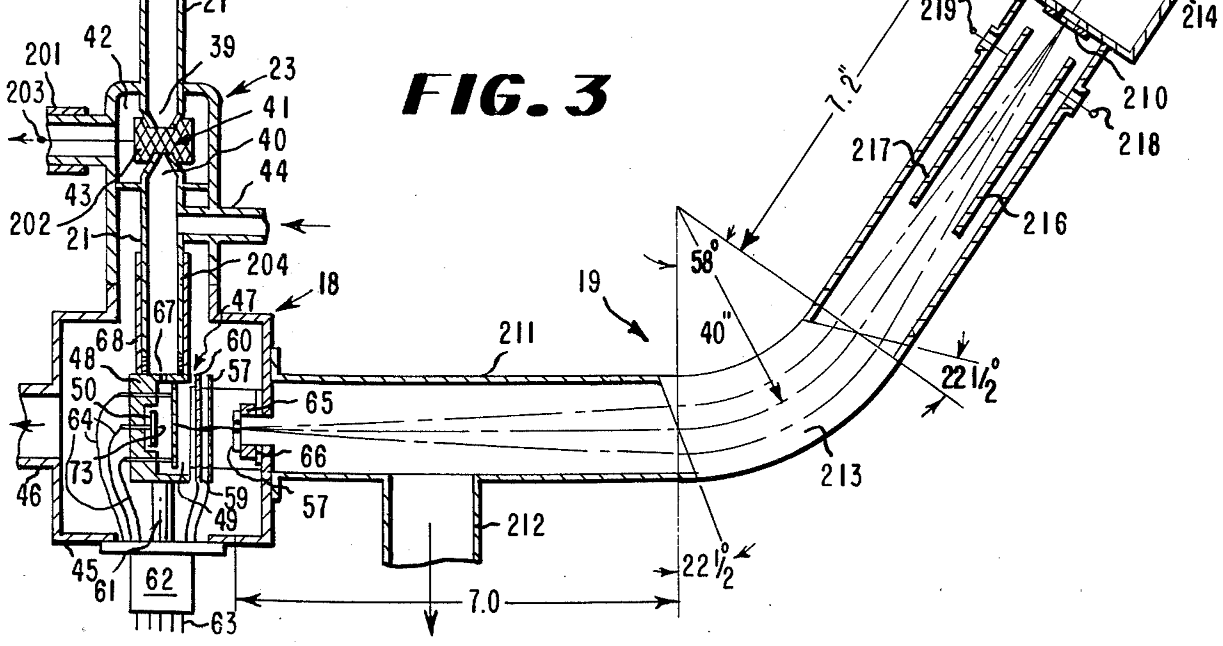
FIG. 3 is a cross-sectional drawing of a portion of the interface connecting the gas chromatograph to the mass spectrometer including a cross-sectional view of the mass spectrometer itself.

The remaining portion of interface conduit 21 is shown in FIGS. 3 and 4. In FIG. 3, interface conduit 21 connects sample gas enricher 23 which, in the embodiment shown, is a jet separator. The jet separator comprises a jet nozzle 39 and a skimmer nozzle 40 which are aligned with but displaced from one another to form a separation region 41. The carrier gas is normally a light gas, such as helium. When sample and carrier gas traveling down interface conduit 21 reach separation region 41, the heavier sample gas has a tendency to maintain its forward flight and pass through the hole in skimmer nozzle 40, whereas the lighter carrier gas has a tendency to diffuse radially outward from separation region 41 into enclosed space 42. Enclosed space 42 is evacuated by means of a vacuum pump, not shown, connected to enclosed region 42 by conduit 43.

As shown in FIG. 3, skimmer nozzle 40 is connected to the ion beam source 18 of the mass spectrometer. A more sophisticated connection will be discussed below in conjunction with FIG. 4. In the embodiment shown, an auxiliary sample injection port 44 is provided so that sample gas from sources other than the gas chromatograph can be introduced into the mass spectrometer.

The ion beam source for the mass spectrometer is generally enclosed in an evacuated chamber within container 45. Container 45 is usually maintained at ground potential and is evacuated by a diffusion pump, not shown, connected to the chamber by a conduit 46. Finally, the interface structure is contained in an oven, not shown, which is used to control the temperature of the jet separator.

Figure 5:
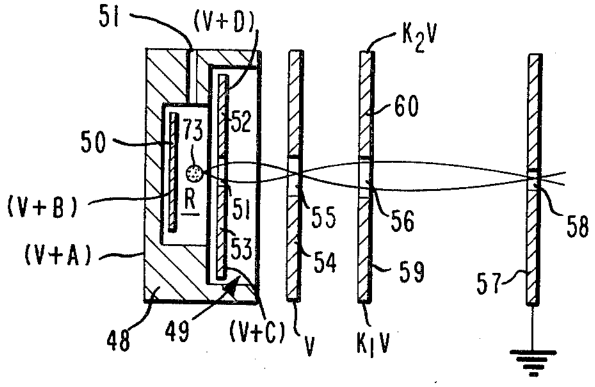
FIG. 5 is a schematic, cross-sectional top view of one embodiment of the ion beam source of the present invention.
Figure 6:
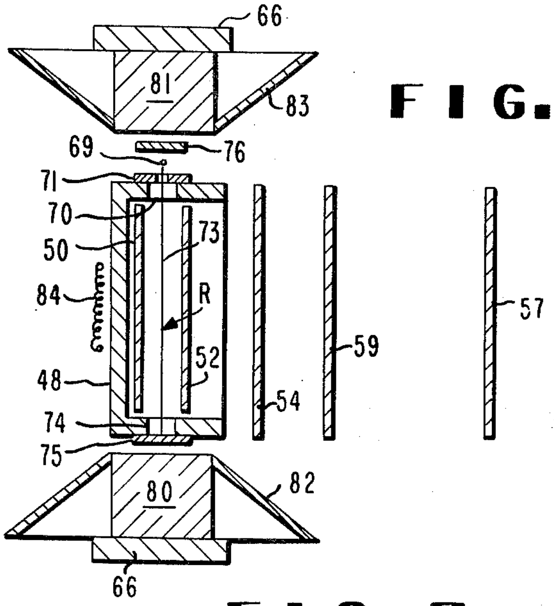
FIG. 6 is a schematic, cross-sectional side view of the ion beam source shown in FIG. 5.
Figure 7:
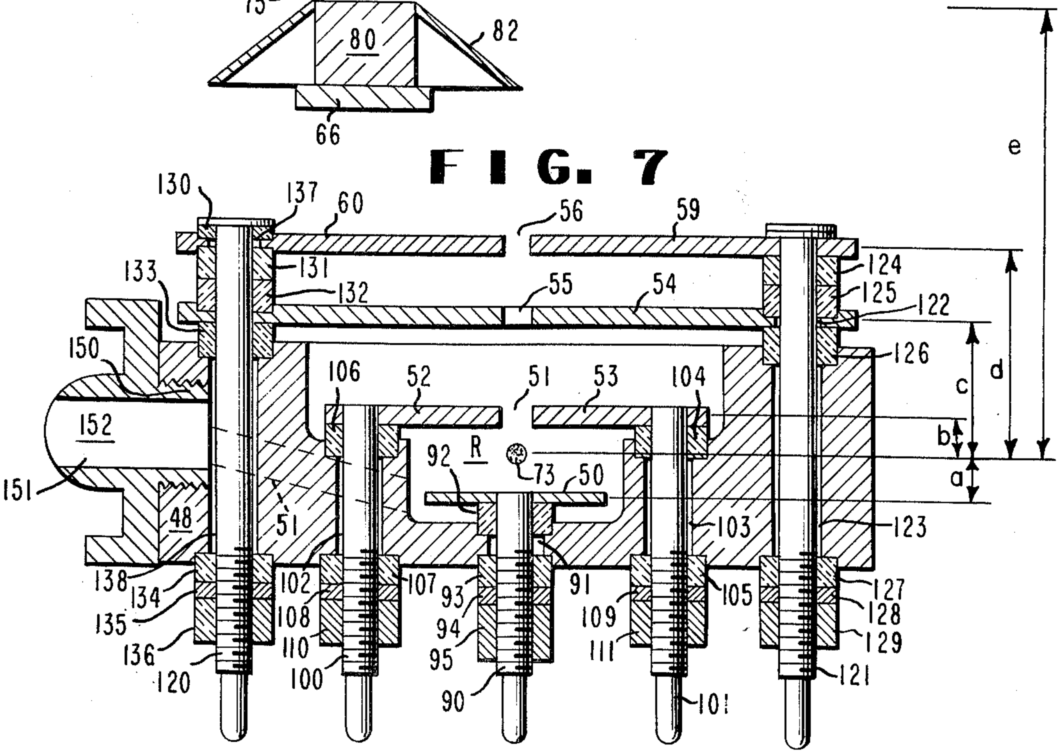
FIG. 7 is a detailed cross-sectional, top view, of a portion of the ion source shown in FIG. 5.

The ion beam source, designated generally by 47, is shown in expanded form in FIGS. 5, 6 and 7. It consists of a housing 48 containing a cavity 49 and a plurality of electrodes. Among the electrodes are a repeller electrode 50 and a first, low energy, alignment electrode with a first alignment slit 51 contained in it. In the embodiment shown, the first alignment electrode comprises a pair of plates 52 and 53 which are aligned with respect to one another to define the first aligned slit 51. The first alignment electrode and the repeller electrode are disposed relative to one another to define an ion-forming region R between them.

The ion beam source also comprises an extraction electrode 54, with an extraction slit 55 contained in it; a second, high energy alignment electrode, having a second alignment slit 56 contained in it; and an entrance electrode 57, with an entrance slit 58 contained in it. As with the first alignment electrode, the second alignment electrode shown in the embodiment illustrated comprises two plates, 59 and 60, disposed relative to one another to define the second alignment slit 56. Extraction electrode 54, however, is a single plate.

These five electrodes are disposed in sequential order with the repeller electrode and the first alignment electrode disposed in the cavity of housing 48. In the embodiment illustrated, the electrodes are plane parallel electrodes, but any suitable configuration well known to those skilled in the art of ion beam optics can be utilized. Furthermore, the ion beam source can be operated without the extraction electrode. The housing and electrodes are all made from suitable metals, such as non-magnetic stainless steel or Nichrome V.

The ion beam source and all electrodes except the entrance electrode, are supported on a support rod 61, which is attached to a turret 62 held in vacuum tight association with container 45. As shown in FIG. 3, turret 62 also comprises a plurality of pins 63 which are connected to the electrodes of the ion beam source by wires 64. The entrance slit 57 is supported separately by structure 45 utilizing a support block 65 and a core 66, the purpose of which will be discussed below. It is maintained at ground potential along with container 45.

The ion beam source also comprises an inlet means for introducing gas into the ion-forming region. Ultimately, this inlet means terminates in a conduit 67 formed in housing 48. In its simplest form, shown in FIG. 3, this inlet conduit 51 connects directly to skimmer nozzle 40 by the remaining length of interface conduit 21. Since the major portion of the interface conduit and the sample gas enhancing means is formed from glass, some metal glass interface in the region 68 must be provided.

Finally, the ion beam source comprises some means for forming an electron beam in the ion-forming region. Any conventional means for forming this beam well known to those skilled in the art of ion optics may be used. An ion gun would be suitable. In the embodiment illustrated, however, the means for forming an electron beam is merely an electrode 69. Housing 48 has an electron beam aperture, which in the embodiment shown in FIG. 6, comprises an orifice 70 in housing 48, covered by a plate 71 with electron orifice 72 formed therein. Electron beam 73 is formed by maintaining electrode 69 at a negative potential relative to housing 48. This beam terminates in a well formed in housing 48 by orifice 74 and plate 75. Finally, a cap 76 is provided over electrode 69. In the configuration shown, a potential of 70 volts between electrode 69 and housing 48 is sufficient to produce the desired electron beam.

Some means to produce a magnetic field in the ion-forming region parallel to the longitudinal axis of the electron beam is helpful. This confines and stabilizes the electron beam. In the embodiment illustrated, this magnetic field is produced by a pair of permanent magnets 80 and 81 with their poles supported by core 66 relative to housing 48 to produce the desired magnetic field in the ion-forming region. A field of 500 Gauss is sufficient to produce the desired effect.

The ion beam source of the present invention is a variable energy ion beam source. The operation of the ion beam source to produce such a variable energy ion beam will be discussed below, but for present purposes, it is sufficient to note that to produce such a variable energy ion beam, the potential of the electrodes must be varied from a low potential to a high potential. For the apparatus illustrated in FIG. 3, sweeping the energy from a low value of about 540 V to a high value of 12,000 V will sweep the detected mass from 999 Atomic Mass Units (AMU) to 43 AMU.

The use of a magnetic field in conjunction with the ion beam source creates an ideal environment for trapped charges in the region surrounding the magnetic poles. The high energy of the ion beam source will cause a discharge between these trapped charges and ground. These spurious and detrimental discharges can be eliminated if the ion source is provided with electrical conductors which intercept the trapped charged region, and conduct the trapped charges to ground. It has been observed that the trapped charges form in an annular shaped region surrounding each of the poles, and that conical caps 82 and 83 made out of conducting foil and disposed relative to pole pieces 80 and 81 as shown in FIG. 6, function to intercept the trapped charged region, and if grounded, will conduct the charge to ground before sufficient potential is built up to allow discharge.

Finally, there is some advantage to controlling the temperature of the ion beam source carefully. For this purpose, a heater 84 disposed adjacent to housing 48 is provided.

A more detailed representation of the ion beam source of FIG. 3 is shown in FIG. 7. In this figure, the housing, electrode, slits and inlet conduit are all labeled with the same numbers used in the other figures, but the electrode connection and supports are shown in more detail. All of the electrodes, except the entrance electrode, are supported from the housing by a plurality of support rods which pass through holes in the housing. These support rods also provide electrical connections to the electrodes. As shown in FIG. 7, the repeller electrode is a flat plate 50 supported by a partially threaded rod 90 passing through a channel 91 in housing 48. Rod 90 is welded to repeller 50, but any suitable connection can be used. Rod 90 provides electrical connection to repeller 50 and is insulated from housing 48 by two insulating washers 92 and 93, which may be made from any suitable material, such as sapphire. These washers sit in annular recesses formed in channel 91. A metal washer 94 is provided along with a nut 95, which screws onto the threaded end of rod 90.

Each of the metal plates 52 and 53 which comprise the first alignment electrode are supported in a similar manner by rods 100 and 101, respectively. Solid electrical connection is made between each of these rods and their respective plates by a welded joint. Rod 100 passes through channel 102 in housing 48 and rod 101 passes through channel 103 in housing 48. As with the repeller electrode, each of the plates for the first alignment electrode are insulated from housing 48 by pairs of insulating washers 104, 105 and 106 and 107, respectively, which fit in annular recesses formed in housing 48. Lock washers 108 and 109 and threaded nuts 110 and 111 which fit on the threaded ends of rods 100 and 101, respectively, are provided to hold the rods in place relative to housing 48. The use of different offset washers, or enlarged annular recesses, will allow plates 52 and 53 to be moved relative to one another. This provides a degree of freedom in focusing the ion beam.

In a similar manner, both extraction electrode 54 and plates 59 and 60 of the second electrode are mounted with respect to housing 48 by rods 120 and 121. In particular, extraction electrode 54 is supported by rods 120 and 121, but its electrical contact is made with only rod 120. Plate 60 of the second alignment electrode is also supported by and electrically connected to rod 120. Plate 59 of the second alignment electrode is supported by rod 121, but its electrical connection is supplied by an additional rod behind 121, not shown, which is connected to it in the manner that plate 60 is connected to rod 120. Specifically, plate 59 is welded directly to rod 121, which then passes through a channel 122 in extraction electrode 54 and a channel 123 in housing 48. The spacing between plate 59 and electrode 54, as well as the insulation of rod 121 from electrode 54 is accomplished by four electrically insulating washers 124, 125, 126, and 127, respectively. A metal washer 128 and a nut 129 which fit on the threaded end of rod 121 are also provided to hold this arrangement into engagement with housing 48. Plate 60 is supported by rod 121, but insulated from it by electrically insulating washers 130 and 131. To provide support without welding rod 120 to plate 60, rod 120 has a T cap which engages washer 130. Rod 120 passes through channel 137 in plate 60 and channel 138 in housing 48. Insulating washers 131 and 132 maintain the spacing between plate 60 and electrode 54, and rod 120 is connected directly to electrode 54. Finally, rod 120 is insulated from housing 48 by insulating washers 133 and 134. Lock washer 135 and nut 136 which fit on the threaded end of rod 120 complete the attachment mechanism. Behind the rods shown in cross-section in this figure, there is a complementary set of rods which also provide support and electrical connection for the electrodes. Plates 52, 53, 59 and 60 are supported by two rods, extraction electrode 54 is supported by four rods, and repeller electrode 50 is supported by two rods. Electrical connection to the electrodes can be through these rods or by separate wires connected to the electrodes.

The dimension of the ion beam source other than the spacing of the electrodes and the width of the slits is not critical. The separation distance of these electrodes and the slit width are given in Table I where *a* represents the spacing between the repeller electrode and the electron beam, *b* the spacing between the first alignment electrode and the electron beam, *c* the spacing between the extraction electrode and the electron beam, *d* the spacing between the second alignment electrode and the electron beam, and *e* the spacing between the entrance electrode and the electron beam.

TABLE I

| SEPARATION | DISTANCE | SLIT | WIDTH |
|---|---|---|---|
| a | 0.05" | first alignment | 0.05" |
| b | 0.07" | extractor | 0.05" |
| c | 0.24" | second alignment | 0.05" |
| d | 0.36" | entrance | 0.003" |
| e | 0.79" | | |

Attached to housing 48, by a threaded fitting 150, is a ball shaped connector 151. This connector and the threaded fitting have a channel 152 extending through them which connects with inlet channel 51 of housing 48. Through this path sample gas passing into the ball shaped connector will be fed directly to the ion-forming region. A preferred way of connecting interface conduit 21 to the ion beam source through ball shaped connector 151 is shown in FIG. 4 where a connecting tube 153, the purpose of which will be described below, is shown threadedly engaging ball shaped connector 151. Disposed within tube 153, is a spring loaded arrangement comprising two fittings, 154 and 155. One end of fitting 154 is curved to mate with ball shaped connector 151, and one end of fitting 155 is curved to accept the rounded end of a glass tube 21. The other end of fitting 155 slips into a recess formed in one end of fitting 154, and the two fittings are held in tension by spring 156. Finally, fittings 154 and 155 are retained within tube 153 in contact with ball fitting 155 by a pair of slip rings 157 and 158. When gas enricher 23 is connected to the ion beam source 18 by connecting the glass walls of the enricher to the metal wall of container 45, the end of interface coupling 21 mates with the recess in fitting 155 so that the internal conduit in tube 21 mates with conduits 157 and 158 in fittings 154 and 155, respectively. Thus, a gas path is formed between the sample gas enricher 23 and ion-forming region R.

As indicated above, the ion beam source is a source designed to produce a beam of ions having variable energy. This is accomplished by varying the potential of the ion beam source from a low value to a potential exceeding 12,000 volts. Furthermore, although a gas chromatographic column operates at about 1 atmosphere of pressure, the ion source operates at a pressure of about 0.001 Torr. The pressure of the carrier and sample gas in interface conduit 21 gradually reduces from about atmospheric pressure to about 0.001 Torr. In the sample gas enrichment device, the pressure is about 0.1 Torr. This pressure drop is accomplished by the various pumps associated with the jet separator through channel 43 and the ion source through channel 46. As the gas pressure in interface conduit 21 increases from 1 atmosphere to about 0.001 Torr, it passes through a pressure range which is ideally suited for a gas discharge. If the pump used to evacuate the jet separator is at ground potential, and the ion source is at a varying potential up to 12,000 volts, the entire conduit from the pump, through the jet separator, to the ion source tends to behave like a neon sign. This tendency can be overcome by raising the potential of the pump and those portions of the interface conduit when the pressure is reduced to that of the ion beam source. To accomplish this, the pump itself is electrically connected to the ion beam source and a conductive sheath 201, which is also connected to the ion beam source, is placed around conduit 43 leading from region 42 to the pump. In addition to this, a wire screen 202 is placed in region 41 separating jet nozzle 39 from the skimmer nozzle 40 of the jet separator, and this is electrically connected to the ion beam source through connector 203. Finally, as much of interface conduit 21 leading from the skimmer nozzle 40 to the ion beam source as possible is sheathed in an electrical conductive medium which is also electrically connected to the ion beam source. In the embodiment shown in FIG. 4, conducting sheath 204 is actually tube 153 which threadedly engages ball shaped connector 151.

Before discussing the electrical connection to the electrodes of the ion beam source, the remaining portion of the mass spectrometer will be described. Magnetic sector 19 of the mass spectrometer 16 consists of a path between entrance electrode 57, which separates the ion beam source from the magnetic sector, and another slit 210, referred to as the exit slit, which separates the magnetic sector from the detector. These two slits are connected by a tube 211 which is evacuated by a diffusion pump, not shown, connected to tube 211 by conduit 212. A portion of tube 211 passes between the poles of a magnet. When the ion beam passing through tube 211 reaches the region permeated by the magnetic field created by magnet 213, the ions in the beam are deflected by an angle dependent on their energy. By proper selection of the parameters involved, the spreading beam which enters the magnetic sector through entrance slit 58 can be focused on exit slit 210. The choice of these parameters is well within the ability of one skilled in the art of mass spectrometry. One suitable arrangement is shown in FIG. 3. In this embodiment, the poles of magnet 213 subtend an arc of 58°, and the entrance and exit faces of the pole are canted at 22½° from the perpendicular. The radius of curvature of the center of the pole piece is approximately 4 inches, the distance between the entrance slit and the spot where the median line of the ion beam path enters the magnetic region (neglecting fringing fields) is about 7 inches, and the distance between the exit slit and the spot where the median line of the ion beam path enters the magnetic region is approximately 7.2 inches.

In the type of mass spectrometer disclosed herein, the magnetic field is essentially fixed. One convenient setting would be 10,000 Gauss. Using the apparatus of FIG. 3 with the magnetic field set at 10,000 Gauss, ions with mass varying between 43 and 999 AMU can be focused on detector 20 by varying the energy of the ion beam between 540 and 12,000 V. Below 43 AMU, however, difficulties arise because of the high electrical fields necessary. In spite of the fact that most masses of interest are to be found in the range between 43 and 999 AMU, the present instrument is equipped with means for decreasing the magnetic field below the set value so that masses below 43 AMU can be measured if desired. Detector 20 comprises a housing 214, in which is located an electron multiplier 215 of conventional design well known to those skilled in the art. Adjacent to the exit slit 210 separating the magnetic sector from the detector, and disposed on either side of the ion beam, two parallel electrodes 216 and 217 are located. These two plates are connected to a source of alternating potential by connectors 218 and 219. The purpose of these plates will be discussed below.

The basic elements of the ion beam source of the present invention comprise the repeller electrode, the first and second alignment electrodes, and the entrance electrode. As has been alluded to above, the basic problem with ion beam sources in which the energy of the ion beam is varied over a wide range of energies is that, although it is possible to align the elements of the ion source at a given energy to produce a focused ion beam at that energy, once the potential of the ion source has been changed significantly, the ion beam defocuses and eventually is lost. It has now been found that this problem can be avoided if the energy of the repeller electrode and the first and second alignment electrodes are all swept together relative to the entrance electrode. In particular, it has been found that if the repeller electrode is maintained at a constant potential relative to the first alignment electrode, the second alignment electrode is maintained at a potential more negative than but proportional to that of the first alignment electrode, and the first alignment electrode is maintained at a constant positive potential relative to said entrance electrode, then it is possible to vary the potential of the first alignment electrode relative to the entrance electrode over a wide range of energies and still maintain an ion beam which focuses on the entrance slit.

Although this electrode configuration works reasonably well, it can be substantially improved by utilizing a fifth electrode, the extraction electrode, located between the first and second alignment electrodes. In this configuration, all potentials are keyed to the potential of the extraction electrode, with the exception of the entrance electrode which is normally maintained at ground potential. In this configuration, the repeller electrode is maintained at a constant potential relative to the first alignment electrode, and the first alignment electrode at a constant positive potential relative to the extraction electrode. The second alignment electrode is then maintained at a potential more positive than, but proportional to, that of the extraction electrode, and the first alignment electrode is maintained at a positive potential relative to the entrance electrode. It is the potential of the extraction electrode that is varied to vary the energy of the ion beam. The system can be even further improved by including a housing maintained at a constant positive potential relative to the first alignment electrode.

Referring to FIG. 5, the potentials of the various electrodes in the housing are chosen so that they become progressively more positive as one proceeds from the entrance electrode to the repeller electrode. The repeller electrode can theoretically have a potential more positive than that of the housing. In this configuration, there would be an equipotential line equal to the housing potential between the repeller electrode and the first alignment electrode in the ion-forming region. It is to be expected that this equipotential would be an ideal location for the electron beam. Although this configuration does work, it has been found that the electrode system functions better if the repeller electrode is maintained at a negative potential relative to the housing.

If a potential V is assigned to the extraction electrode, then, assuming that the entrance electrode is grounded, the remaining electrodes will have the potentials indicated in FIG. 5; e.g., $K_1V$, $K_2V$, V+A, V+B, V+C, and V+D. As stated above, it is the potential of the extraction electrode which is swept relative to the entrance electrode. The absolute values of the potentials used in the ion beam source will, of course, vary with the dimensions of the ion beam source, but for the ion beam source shown in FIGS. 5 and 7, if potential V is swept between 540 and 12,000 volts, the mass spectrometer will have a mass range of 43 to 999 AMU. The plates of the second alignment electrodes are then maintained at a potential proportional to the potential of the extraction electrode. The constants of proportionality, $K_1$ and $K_2$, range between about 0.8 and 0.95, with a value of about 0.85 being normal. The housing is maintained at a potential A with respect to the extraction electrode, with the value of A ranging from 0 to about 90 volts, nominally 50 volts. The potential of the repeller is maintained at a constant potential B with respect to the electraction electrode. B ranges from about −50 to about 140 volts, but is best expressed in terms of its relationship to constant A. In these terms, B ranges from (A−50) to (A+50) volts, nominally 45 volts. The plates of the second alignment electrode are maintained at substantially the same potential. The constants C and B range between −50 and 90 volts. Once again expressed in terms of their relationship with the constant A, these constants range from A to (A−50) volts, nominally about 35 volts. These values are shown in Table II.

TABLE II

| CONSTANTS | RANGE | RELATION TO A | NOMINAL |
|---|---|---|---|
| A | 0–90 | | 50 |
| B | (−50)–140 | (A-50)–A+50) | 45 |
| C,D | (−50)–90 | A-(A-50) | 35 |
| $K_1$,$K_2$ | 0.80–0.95 | | 0.85 |

In operation, electron beam 73 strikes the gas molecules introduced into the ion-forming region R by the gas chromatograph, and ions are formed. The potential of the extraction electrode draws these ions from the ion-forming region and focuses them at a point between the first and second alignment electrodes in the region generally designated as the extraction slit. The ion beam is then refocused at the entrance slit. The first and second alignment electrodes are called alignment electrodes because they can be used to align the ion beam. Both the first and second alignment electrodes are composed of two separate plates with separately adjustable potentials. The first alignment electrode has a more pronounced focusing effect on the low energy portion of the ion beam, hence, it is referred to as the low energy alignment electrode. The second alignment electrode has a more pronounced focusing effect on the high energy ions in the beam, hence, it is referred to as the high energy alignment electrode. When V is at the low end of the potential range, the relative potentials of the two plates making up the first alignment electrode can be varied to focus the ion beam on the entrance slit, and when V is at the high end of the energy range, the relative potential of the two plates making up the second alignment electrode can be varied to focus the ion beam on the entrance slit. In this manner, the ion beam source can be "tuned" so that the ion beam remains focused at the entrance slit as the energy of the beam is varied.

The energy of the ion beam emerging from the ion beam source can be varied either continuously, by continuously varying the potential of the extraction electrode relative to the entrance electrode, or discretely, by incrementally varying the energy of the extraction electrode relative to the entrance electrode. Discretely varying the energy of the ion beam offers some advantages in simplifying control of the apparatus and digitalizing its operation. However, operation in this mode does raise some problems. The mass spectrometer illustrated, and magnetic mass spectrometers generally, are constant resolving power machines. This means that over the range of masses covered, the resolution in each increment of the mass spectrum is the same as the resolution in every other increment of the mass spectrum. The resolving power of the mass spectrometer is defined as $M/\Delta M$, where $M$ is the mass of the ion in AMU and, $\Delta M$ is the width of the mass peak, at a particular mass. If the resolving power is constant, and $M$ is large, $\Delta M$ will also be large and the mass peak will be wide relative to mass peaks at lower masses. The disparity between mass widths causes two problems. First of all, it tends to be confusing to those interpreting the mass spectrum. This is true whether the continuous or discrete mode of varying the energy of the ion beam is used. When the discrete mode is used, however, the narrow width of low mass lines causes a more troublesome problem. Depending upon the difference in energy between one discrete level and the next in the operation of the ion beam source, certain of the mass lines can be lost. If they are located within the energy level shift and are narrow enough not to extend across the energy level shift, they may go completely unnoticed.

To solve this problem, the mass spectrometer of the present invention has been provided with a pair of plates 216 and 217 located adjacent to the exit slit of the mass spectrometer. When an AC potential (preferably a saw tooth or triangular waveform) is applied to these plates, the focus point of the mass beam oscillates back and forth across the exit slit. This causes a broadening of the mass line. In this way, the aesthetic appearance of the mass spectrum is enchanced, and no mass lines are lost in the transition from one discrete energy level to the next. The potential applied to plates 216 and 217 should be chosen according to the geometry of the mass spectrometer. For the apparatus described above, a potential of up to 100 V has been found to be suitable. The plates shown in FIG. 3, however, are fairly long. If the plates are long, a lower voltage can be used to defocus the ion beam and the danger of electrical breakdown decreases, but large plates do not have very good high frequency response. Small plates have better high frequency response, but higher potentials must be used with small plates to accomplish the desired defocusing, and higher potentials are more difficult to produce. Optionally, the plates should be as small as possible and the voltage as high as possible. The potential should be varied at a frequency between 50 and 200 killohertz with approximately 100 killohertz being normal.

In operation, this artificial broadening of the lines is not needed at masses higher than about 300 AMU. Hence, in operation, the alternating potential is turned on in the mass range between 43 AMU and 300 AMU, and is turned off above that point.

Figure 8:
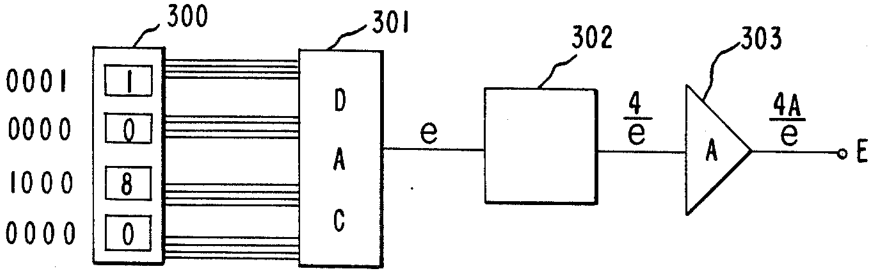
FIG. 8 is a schematic diagram of a circuit which can be used to program the mass sweeping operations of the apparatus shown in FIG. 3.

FIG. 8 shows, schematically, the way in which the energy of the ion beam is increased incrementally. A four-place binary coaded decimal register (BCD) 300 is provided. Such a register is sold by Motorola under the designation MC 14042 or MC 14510. This register is designed to have a number between 0 and 999.9, in tenth of a decimal increments, loaded into it. Each place in the BCD is connected to a digital to analog converter 301 by four wires. By using a binary code, any digit ranging from 0 to 9 in each place can be communicated to the digital to analog converter. The digital to analog converter can be of any conventional design, such as a CY 2736 sold by Cycon Inc., which is designed to generate a voltage *e* proportional to the number which appears in the four place binary chip. This voltage is then fed to a divider 302 which is designed to generate a voltage proportional to the reciprocal of the voltage *e* generated by the digital to analog converter. Such a divider can be purchased from Functional Moduals, Inc. as Model 9522. Finally, the output of divider 302 is fed to an amplifier 303. This amplifier should be linear, stable, fast, and noise free. It should also be able to accommodate high voltages. By virtue of the way in which the mass spectrometer operates, the higher the voltage applied to the ion beam source, the lower the mass of the ions incident on the detector. By use of divider 302, one can produce a voltage *e* which when calibrated and applied to the ion beam source will focus a beam having the mass shown in the four-place BDC on the detector of the mass spectrometer.

Figure 11:
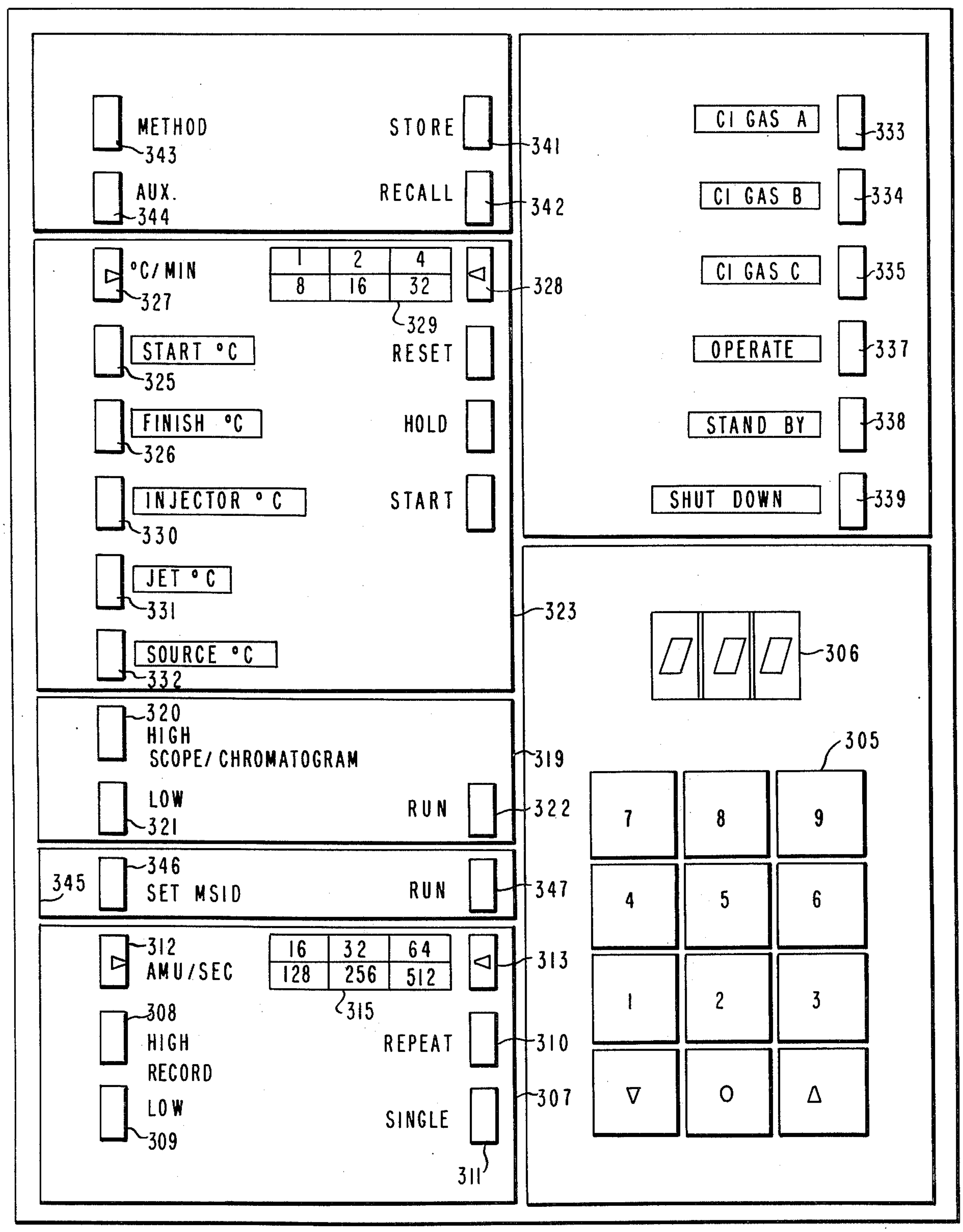
FIG. 11 is a schematic view of a control panel for use with the analyzer shown in FIG. 3.

FIG. 11 illustrates the control board used for the mass spectrometer of the present invention. The lower right hand corner of this control board is a key board 305 and a display 306 which allows one to program at will the computers operating the system. In the lower left hand corner of the console is a mass programming unit 307 which allows one to choose the mass range of interest. By depressing button 308, labeled "high", and typing into the system the high mass that one is interested in; and then by depressing key 309 marked "low", and typing into the system the low mass of interest, one can effectively set the mass range of interest. The low mass value is transferred to four-place BDC 300. By pressing button 310 or 311, to BCD 300 will automatically proceed from the low value to the high value in tenths of a mass unit increments. A single sweep can be obtained by pressing button 311 and a repeat sweep can be obtained by pressing button 310. The rate at which the mass sweep occurs can be set by using a system shown in FIG. 8, and buttons 312 and 313.

Figure 9:
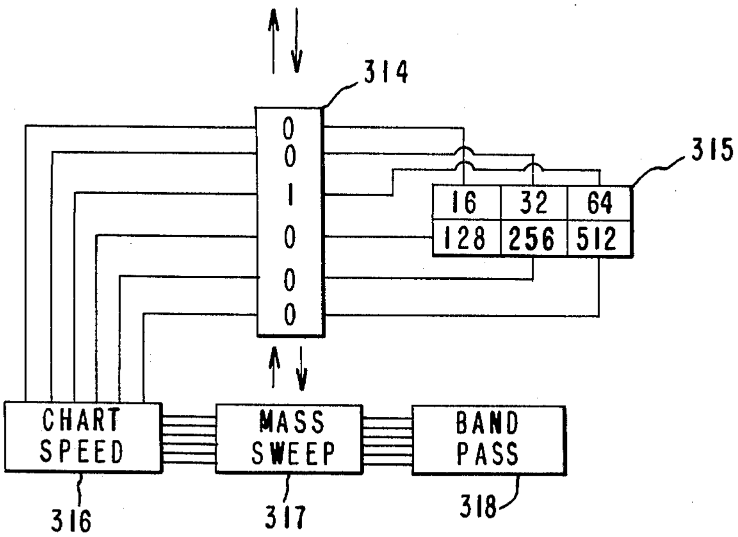
FIG. 9 is a schematic diagram of an electronic system which can be used to vary in a controlled manner the operation of the apparatus shown in FIG. 3.

The heart of the mass sweep system is an up-down load register 314 which is a solid state device of the type sold by Motorola as Model MC 14510. It is designed to generate a voltage corresponding to the state in which the device resides. This state of the system can be changed sequentially from one position to another up its scale by pushing button 312 and down its scale by pushing button 313. One set of leads from this system is connected to a display 315, and another set of leads is connected to a number of operative elements such as a chart speed control 316, a mass sweep control 317, and a band pass control 318. When the solid state device is in a particular state, as indicated by FIG. 9, a particular chart speed, a particular mass sweep and a particular band pass for that mass sweep are activated, and a light identifying the rate at which the mass is swept in AMU per second is displayed on display 315. Although the system is capable of sweeping 2,000 AMU per second, with a return rate of 0.003 second, mechanical charts are not capable of running this fast, so the most rapid mass sweep available to the system in this mode is 512 AMU per second. The mass sweep can, however, be displayed upon a scope whose speed is not mechanical restrained. The system is designed, therefore, to be able to program, the same, or a different mass range for readout by the scope using the scope programming unit 319, high button 320, and low button 321. Using key board 305, one can program the high and low mass for a sweep at 2,000 AMU per second. Pressing run button 322 will allow this sweep to be made and recorded on the scope.

Other parameters of the system can be set using temperature control unit 323. Using buttons 325 and 326 and key board 305, the starting and finishing temperatures of the chromatographic column can be controlled, with the rate of change in degrees per minute being controlled by buttons 327 and 328, and display unit 329. Buttons 327 and 328, and display 329 operate in much the same way as the system described with respect to FIG. 8. By depressing buttons 330, 331, and 332, in turn, one can set the injector temperature, the jet temperature, and the source temperature for the system using key board 305.

Normally, the system provides for the use of a number of different gases for chemical ionization and by depressing buttons 333, 334 and 335 on control station 336, one can chose the desired gas. By utilizing buttons 337, 338 and 339, one can place the system in an operate, a stand-by, or a shut-down mode.

By using memory location 340, one can store into a memory, not shown, a particular method and recall it by pushing buttons 341 and 342, respectively. The method can be given a storage number by depressing button 343 and using key board 305. An auxiliary button 344, for access to other operations, is also provided.

The final station on the control board 345, is used to activate a recognition system designed to identify specific mass peaks. These specific mass identification peaks can be read into the system by pushing button 346 and the recognition procedure started by pushing button 347.

Figure 10:
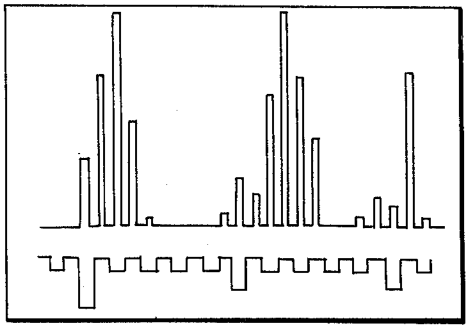
FIG. 10 is a graph of the output of the analytical apparatus of FIG. 3 showing both the mass spectrum of a fictional gas and a mass marking trace.

The use of a discrete energy system to run the mass spectrometer enables one to construct a very simple mass identification system. This mass identification system is shown in FIG. 10 where the upper line represents a mass spectrum of a fictional gas and the lower line represents a square wave which is generated by the system shown in FIG. 8. Every time BCD 300 increments by one mass unit, one leg of a square wave is generated. The square wave has a set amplitude, which doubles every time a ten mass unit is reached and triples every time a one hundredth mass unit is reached. The construction of an electronic circuit to produce such a square wave from the incremental voltage produced by the system in FIG, 8 is well within the capability of one skilled in the art.

The above discussion is intended to illustrate the invention. Various modifications can be made by those skilled in the art. The description is not intended to limit the scope of the invention which is set forth in the following claims.

What is claimed is:

1. A source to produce a variable energy ion beam, comprising:

a. a repeller electrode;
b. first, low energy, alignment electrode, having a first alignment slit therein and coacting with said repeller electrode to define an ion-forming region therebetween;
c. inlet means for introducing gas into the ion-forming region;
d. means for forming an electron beam in said ion-forming region;
e. second, high energy, alignment electrode having a second alignment slit therein;
f. an entrance electrode having an entrance slit therein, all of the aforesaid electrodes being in sequential order and all of the aforesaid slits being aligned to define a trajectory between the electron beam and the entrance slit;
g. means for maintaining said repeller electrode at a constant potential relative to said first alignment electrode;
h. means for maintaining said second alignment electrode at a potential more negative than and proportional to that of said first alignment electrode; and
i. means to maintain said first alignment electrode at a positive potential relative to said entrance electrode and to vary its potential relative to said entrance electrode.

2. A source to produce a variable energy ion beam, comprising:

a. a repeller electrode;
b. first, low energy, alignment electrode, having a first alignment slit therein and coacting with said repeller electrode to define an ion-forming region therebetween;
c. inlet means for introducing gas into the ion-forming region;
d. means for forming an electron beam in said ion-forming region;
e. an extraction electrode with an extraction slit therein;
f. second, high energy, alignment electrode having a second alignment slit therein;
g. an entrance electrode having an entrance slit therein, all of the aforesaid electrodes being in sequential order and all of the aforesaid slits being aligned to define a trajectory between the electron beam and the entrance slit;
h. means for maintaining said repeller electrode at a constant potential relative to said first alignment electrode and said first alignment electrode at a constant positive potential relative to said extraction electrode;
i. means for maintaining said second alignment electrode at a potential more negative than the proportional to that of said extraction electrode; and
j. means to maintain said extraction electrode at a positive potential relative to said entrance electrode and to vary its potential relative to said entrance electrode.

3. The ion beam source of claim 2 wherein said means for maintaining said repeller electrode at a constant potential relative to said first alignment electrode is a means to maintain said repeller electrode at a constant positive potential relative to said first alignment electrode.

4. The ion beam source of claim 3 comprising:

a. a housing having a cavity in which said repeller electrode and said first alignment electrode are located; and
b. means to maintain said housing at a constant positive potential relative to said first alignment electrode.

5. The ion beam source of claim 4 wherein said housing contains an electron beam aperture and said means for forming an electron beam is an electrode disposed adjacent to the electron beam aperture and maintained at a negative potential relative to said housing.

6. The ion beam source of claim 5 further comprising a magnet with its poles disposed relative to said housing to provide a magnetic field in said ion-forming region parallel to the longitudinal axis of the electron beam.

7. The ion beam source of claim 6 further comprising a pair of grounded shields, one associated with each pole of said magnet and flared with respect to those poles to intercept any trapped charges surrounding the poles of said magnet.

8. The ion beam source of claim 4 wherein said first alignment electrode comprises a pair of electrode plates disposed relative to one another to form the first alignment slit and wherein said source further comprises means to maintain the plates of said first alignment electrode at a constant potential relative to one another.

9. The ion beam source of claim 8 wherein said second alignment electrode comprises a pair of electrode plates disposed relative to one another to form the second alignment slit and wherein said source further comprises means to maintain the plates of said alignment electrode at a constant potential relative to one another.

10. The ion beam source of claim 4 wherein all of the aforesaid electrodes are plane parallel electrodes.

11. The ion beam source of claim 4 further comprising a heater associated with said housing.

12. An analytical apparatus comprising:

a. a gas chromatograph comprising a gas chromatographic column with a gas inlet and a gas outlet;
b. a mass spectrometer comprising a variable energy ion beam source, a magnetic sector for deflecting the ions in the ion beam according to their momentum and detector means for detecting those ions within the ion beam which have been deflected by a given angle by the magnetic sector, said ion beam source comprising:

i. a repeller electrode;

ii. first, low energy, alignment electrode, having a first alignment slit therein and coacting with said repeller electrode to define an ion-forming region therebetween;

iii. inlet means for introducing gas into the ion-forming region;

iv. means for forming an electron beam in said ion-forming region;

v. second, high energy, alignment electrode having a second alignment slit therein;

vi. an entrance electrode having an entrance slit therein separating said ion beam source from said magnetic sector, all of the aforesaid electrodes being in sequential order and all of the aforesaid slits being aligned to define a straight path between the electron beam and the entrance slit;

vii. means for maintaining said repeller electrode at a constant potential relative to said first alignment electrode;

viii. means for maintaining said second alignment electrode at a potential more negative than and proportional to that of said first alignment electrode;

ix. means to maintain said first alignment electrode at a positive potential relative to said entrance electrode and to vary its potential relative to said entrance electrode; and c. an interface for connecting the gas outlet of said chromatograph to said inlet means of said ion beam source.

13. An analytical apparatus comprising:

a. a gas chromatograph comprising a gas chromatographic column with a gas inlet and a gas outlet;

b. a mass spectrometer comprising a variable energy ion beam source, a magnetic sector for deflecting the ions in the ion beam according to their momentum and detector means for detecting those ions within the ion beam which have been deflected by a given angle by the magnetic sector, said ion beam source comprising:

i. a repeller electrode;

ii. first, low energy, alignment electrode, having a first alignment slit therein and coacting with said repeller electrode to define an ion-forming region therebetween;

iii. inlet means for introducing gas into the ion-forming region;

iv. means for forming an electron beam in said ion-forming region;

v. an extraction electrode with an extraction slit therein;

vi. second, high energy, alignment electrode having a second alignment slit therein;

vii. an entrance electrode having an entrance slit therein separating said ion beam source from said magnetic sector, all of the aforesaid electrodes being in sequential order and all of the aforesaid slits being aligned to define a straight path between the electron beam and the entrance slit;

viii. means for maintaining said repeller electrode at a constant potential relative to said first alignment electrode and said first alignment at a constant positive potential relative to said extraction electrode;

ix. means for maintaining said second alignment electrode at a potential more negative than and proportional to that of said extraction electrode;

x. means to maintain said extraction electrode at a positive potential relative to said entrance electrode and to vary its potential relative to said entrance electrode; and c. an interface for connecting the gas outlet to said chromatograph to said inlet means of said ion beam source.

14. The apparatus of claim 13 wherein said means for maintaining said repeller electrode at a constant potential relative to said first alignment electrode is a means to maintain said repeller electrode at a constant positive potential relative to said first alignment electrode.

15. The apparatus of claim 14 comprising:

a. a housing having a cavity in which said repeller electrode and said first alignment electrode are located; and b. means to maintain said housing at a constant positive potential relative to said first alignment electrode.

16. The apparatus of claim 15 wherein said housing contains an electron beam aperture and said means for forming an electron beam is an electrode disposed adjacent to the electron beam aperture and maintained at a negative potential relative to said housing.

17. The apparatus of claim 6 further comprising a magnet with its poles disposed relative to said housing to provide a magnetic field in said ion-forming region parallel to the longitudinal axis of the electron beam.

18. The apparatus of claim 17 further comprising a pair of grounded shields, one associated with each pole of said magnet and flared with respect to those poles to intercept any trapped charges surrounding the poles of said magnet.

19. The apparatus of claim 14 wherein said first alignment electrode comprises a pair of electrode plates disposed relative to one another to form the first alignment slit and wherein said source further comprises means to maintain the plates of said first alignment electrode at a constant potential relative to one another.

20. The apparatus of claim 19 wherein said second alignment electrode comprises a pair of electrode plates disposed relative to one another to form the second alignment slit and wherein said source further comprises means to maintain the plates of said second alignment electrode at a constant potential relative to one another.

21. The apparatus of claim 14 wherein all of the aforesaid electrodes are plane parallel electrodes.

22. An analytical apparatus comprising:

a. a gas chromatograph comprising a gas chromatographic column with a gas inlet and a gas outlet;

b. a mass spectrometer comprising a variable energy ion beam source, a magnetic sector for deflecting the ions in the ion beam according to their momentum, and detector means for detecting those ions within the ion beam which have been deflected by a given angle by the magnetic sector, said detector means comprising:

i. an ion detector;

ii. an exit plate having an exit slit separating said magnetic sector from said ion detector;

iii. a pair of opposed deflector electrodes disposed within said magnetic sector adjacent said exit plate, one of said deflector electrodes being located on either side of the ion beam; and iv. means for applying an AC potential to said deflector plate; and c. an interface for connecting the gas outlet of said chromatograph to said ion beam source.

23. The apparatus of claim 22 wherein the frequency of said means for applying an AC potential to said deflector plate is in the range between about 50 and about 200 killohertz.

24. An analytical apparatus comprising:

a. a gas chromatograph comprising a gas chromatographic column with a gas inlet and a gas outlet;

b. a mass spectrometer comprising a variable energy ion beam source, a magnetic sector for deflecting the ions in the ion beam according to their momentum, and detector means for detecting those ions within the ion beam which have been deflected by a given angle by the magnetic sector; and c. an interface for connecting the sample gas outlet of said chromatograph to said ion beam source, said interface comprising:

i. an electrically nonconductive interface conduit connecting the sample gas outlet of said chromatograph to said ion beam source, ii. a restriction disposed in said interface conduit to create a pressure drop in said interface conduit between said gas chromatograph and said mass spectrometer, iii. a sample gas enricher disposed in said interface conduit downstream from said restriction for enriching the concentration of sample relative to carrier in the gas flowing through said interface conduit, iv. a first electrical conductor disposed relative to the low pressure region of said interface conduit, and v. means to maintain the potential of said first electrical conductor at about the potential of said ion beam source.

25. The apparatus of claim 24 wherein said sample gas enricher is a jet separator comprising an input nozzle, a skimmer nozzle displaced from said input nozzle, a vacuum pump for evacuating the region between said nozzles, a second electrical conductor disposed in the region between said nozzles, and means to raise the potential of said second conductor and said vacuum pump to about the potential of said ion beam source.

26. The apparatus of claim 24 further comprising:

a. a source of inert gas;

b. an inert gas conduit connecting said source of inert gas to said interface conduit, upstream of said restriction;

c. a valve disposed in said inert gas conduit;

d. a source of calibration gas e. a holding tube connected to said inert gas conduit in parallel with said valve;

f. means for connecting said source of calibration gas to said holding tube and for filling said holding tube with calibration gas; and g. means for diverting the flow of inert gas to sweep the calibration gas contained in said holding tube into said interface conduit.

* * * * *

UNITED STATES PATENT OFFICE
CERTIFICATE OF CORRECTION

PATENT NO. : 4,016,421

DATED : April 5, 1977

INVENTOR(S) : CHARLES W. HULL, T. WILSON WHITEHEAD and BRUCE N. COLBY

It is certified that error appears in the above–identified patent and that said Letters Patent are hereby corrected as shown below:

In Figure 3 and the Abstract drawing, change the radial dimension from "40"" to ---4"---.

Signed and Sealed this

*ninth* Day of *August 1977*

[SEAL]

*Attest:*

RUTH C. MASON
*Attesting Officer*

C. MARSHALL DANN
*Commissioner of Patents and Trademarks*